US011922501B2

(12) United States Patent
McCabe

(10) Patent No.: US 11,922,501 B2
(45) Date of Patent: Mar. 5, 2024

(54) AUDIBLE TRACKING SYSTEM FOR FINANCIAL ASSETS

(71) Applicant: Audible APIs, Inc., Bellmore, NY (US)

(72) Inventor: Anthony McCabe, Bellmore, NY (US)

(73) Assignee: AUDIBLE APIS, INC., Bellmore, NY (US)

( * ) Notice: Subject to any disclaimer, the term of this patent is extended or adjusted under 35 U.S.C. 154(b) by 0 days.

(21) Appl. No.: 17/980,275

(22) Filed: Nov. 3, 2022

(65) Prior Publication Data

US 2023/0148429 A1 May 11, 2023

Related U.S. Application Data

(60) Provisional application No. 63/278,399, filed on Nov. 11, 2021.

(51) Int. Cl.
*G06Q 40/04* (2012.01)

(52) U.S. Cl.
CPC .................. *G06Q 40/04* (2013.01)

(58) Field of Classification Search
CPC ..................................... G06Q 40/04
See application file for complete search history.

(56) References Cited

U.S. PATENT DOCUMENTS

| 10,672,075 | B1* | 6/2020 | To | G10H 1/0025 |
| 2005/0055267 | A1* | 3/2005 | Chasanoff | G06Q 40/04 84/609 |
| 2005/0240396 | A1* | 10/2005 | Childs | G10H 1/0025 704/207 |
| 2015/0213789 | A1* | 7/2015 | Plott | G10H 1/26 84/645 |
| 2018/0248709 | A1* | 8/2018 | Leydon | H04L 51/212 |

FOREIGN PATENT DOCUMENTS

| KR | 2007-0043571 A | 4/2007 | |
| KR | 20070043571 | * 4/2007 | G06Q 40/04 |

OTHER PUBLICATIONS

An International Search Report dated Mar. 13, 2023 which is enclosed, that issued in PCT Application No. PCT/US2022/048847.
The Written Opinion of the International Searching Authority dated Mar. 13, 2023 which is enclosed, that issued in PCT Application No. PCT/US2022/048847.

* cited by examiner

*Primary Examiner* — Jessica Lemieux
(74) *Attorney, Agent, or Firm* — Cowan, Liebowitz & Latman, P.C.; Mark Montague; Daniel Basov

(57) ABSTRACT

A system for audibly conveying financial information includes at least one processor operatively coupled to a data source via a network, and configured to receive at least one user-selected musical parameter, as well as financial data from the data source associated with a financial asset. The financial data includes a variable parameter which varies over a time period. The at least one processor is further configured to determine, for a plurality of values of the variable parameter during the time period, a plurality of musical notes based on the plurality of values of the variable parameter and the user-selected musical parameter, and to generate audio data associated with the plurality of musical notes. The generated audio data is processable by a device to audibly produce the plurality of musical notes.

21 Claims, 12 Drawing Sheets

Making Money
Taking Crypto Profits with MaMo is Music to My Ears

| DOW Jones 🔍 |
|---|

This service is for entertainment purposes only.

Home    Register    Login

Dow Jones Composite Average
DJA.INDX

Dow Jones Industrial Average — 306
DJI.INDX

Dow Jones Transportation
DJT.INDX

Dow Jones US
DJUS.INDX

DOW JONES EQUITY ALL REIT TOTAL RETURN INDEX
REIT.INDX

Dow Jones 30 Futures
US30.INDX support@marketsmovements.com

| Enter Your Email To Get a Newsletter |
|---|

Newsletters

Terms and Conditions

AUDIBLE TRACKING SYSTEM FOR FINANCIAL ASSETS

CROSS-REFERENCE TO RELATED APPLICATIONS

This application claims priority to U.S. Provisional Patent Application No. 63/278,399, filed Nov. 11, 2021, and titled AUDIBLE TRACKING SYSTEM FOR FINANCIAL ASSETS, the entire disclosure of which is hereby incorporated by reference herein in its entirety.

BACKGROUND OF THE INVENTION

1. Field of the Invention

The present invention relates to information tracking systems, and more particularly, to financial tracking systems and methods for audibly conveying financial asset information.

2. Description of the Related Art

Trading financial assets online is no longer the sole province of institutional investors. Legions of retail (e.g., individual) investors worldwide now use smartphones and other computing devices to access online investment accounts and exchanges. During the pandemic, online investing activity increased as many retail investors became short term traders (e.g., day traders) while working remotely. As approximately 3.8 billion people worldwide now access the internet, the number of online investors is expected to grow substantially over the next decade.

Short-term traders and long-term investors (both referred to herein as 'investors') attempt to maximize profits/returns on financial assets (e.g., stocks, soft and hard commodities, bonds, cryptocurrencies, fiat currencies, equities, securities, and the like) by selecting and purchasing the financial assets before they rise, selling them before they fall, and vice versa, sometimes with call, put, long, and short options. For both short-term traders and long-term investors, these decisions are often based on "charting," Technical Analysis, otherwise known as 'TA,' a trading discipline employed to evaluate investments and identify trading opportunities in price trends and patterns seen on charts, assessing levels of support, Fibonacci retracement levels, fundamentals such as quarterly or year-to-year profits and losses, momentum, volatility, trading volume, etc., most or all of which is ascertained visually on-screen. The ability of an investor to select, buy, and sell an asset before its market value (e.g., price) rises or falls can maximize gains and minimize losses, particularly for short term traders who trade highly volatile financial assets. Maximizing profits through online trading often requires continuous monitoring, which can be difficult or untenable for many investors.

While many retail investors would prefer to monitor financial assets during large portions of the day, the numerous demands of life often preclude continuous monitoring. Work, family, social life, household upkeep, entertainment, travel, and other demands can limit an investor's ability to properly monitor financial assets and make timely decisions. While trading in the market can be exciting and rewarding, a short-term trader may own a volatile financial asset whose price moves significantly relative to its opening price (e.g., increases 75% and then drops to a price which is 25% lower than the opening price), all within a single minute, hour, or day. Unless the investor happens to be paying attention at the right moment, he or she might not ever become aware of these price fluctuations. Moreover, an investor using leverage may deem a variance of even one percent or less significant and actionable.

If the investor owns an asset whose price rapidly increases during trading hours, other sellers may attempt to lock in profits, causing the price to then drop dramatically. The investor may miss the chance to realize this capital gain if, for example, the investor had a preset sell order in place at a higher level than the price the asset reached before rapidly selling off. A classic example of this is the all too common "buy the rumor sell the news" phenomenon, a scenario in which an asset's price goes up in anticipation of news, and then drops dramatically when the actual news comes out during trading hours, and does not live up to or match the rumors/hype. Even long-term investors may own financial assets that, despite having very little movement/variance for most of the year, suddenly rise dramatically in a single day after a headline, a news report, rumors of an acquisition or large purchase, or some other promising development.

As short-term trading (e.g., day trading) requires continuous active monitoring, it is highly demanding and time consuming, and generally requires watching one or more display screens for hours at a time. Even for an investor who has no other obligations and the time to engage in such active monitoring for long periods, the level of focus required and the constant scanning of display screens can cause eye strain, promote an unhealthy, sedentary lifestyle, increase anxiety, and limit the investor's ability to do other things or simply relax.

While an investor has the ability on conventional trading platforms to set automated stop limits for buy/sell orders, these must be preset, and may not be in harmony with the investor's desires/decisions once a financial asset begins behaving differently during a particular hour, day, week, or month. An investor may want to know when a financial asset has begun to behave in a volatile manner and/or when the financial asset approaches or is rapidly approaching preset buy or sell limits so that he or she can cancel or modify buy/sell orders already in place before they automatically execute on a conventional trading platform. In other words, investors who are too busy for continuous monitoring during periods of high volatility often ignore their buy orders, stops and other preset action requests during such high volatility, and thus, may miss out on many great trading opportunities when preset levels are not reached.

Finally, investors who are visually impaired are even more limited in their ability to engage in short term investing. Visually impaired investors are generally either unable to use conventional financial platforms at all to ascertain financial information, or have limited ability to use them in a timely manner, let alone to quickly access or monitor financial information about financial assets in real-time. Visual impairment encompasses numerous conditions whose symptoms range from mild to irreversible blindness with no light perception. Additionally, as investors age, their sight tends to diminish. Approximately 93 million adults in the U.S. are at high risk for serious vision loss. Any person in the U.S. with vision that cannot be corrected to better than 20/200 or who has 20 degrees (diameter) or less of visual field remaining is considered legally blind or eligible for disability classification, and possible inclusion in certain government sponsored programs.

An investor's particular level of visual impairment and the degree to which such visual impairment is treatable thus further impacts the investor's ability to ascertain financial information visually from a screen. Given the foregoing described state of the art, there is a great need in the finance industry for improved tracking/monitoring systems and methodologies for communicating financial asset information, both to investors with normal vision, and to those who are visually impaired.

OBJECTS AND SUMMARY OF THE INVENTION

This summary is not intended to identify or point to essential features or limit the scope of the subject matter claimed herein. The present invention relates to customizable audible financial tracking systems and methods, with at least the following objectives:

- To audibly convey, in the form of audible notes, chords, musical triads, chimes, or any other form of audible noise, real-time and/or historical information (e.g., financial information) about a financial asset or financial category to a user;
- To map a financial asset's variable price over a customizable time period to a customizable musical range;
- To allow for user customization of the type of audible sound communicated when conveying financial information to a user, including notes, chords, triads, pitch, volume, frequency, and one or more musical instruments;
- To audibly communicate a financial asset's historical and/or real-time price fluctuation to a user;
- To enable visually impaired individuals to audibly ascertain financial information;
- To facilitate chart listening, audible technical analysis, and audible pattern recognition associated with visual chart patterns that form with respect to financial asset prices;
- To create audio files of musical compilations created from various user customizable parameters applied to historical and/or real-time financial asset information; and
- To facilitate audible tracking of multiple financial assets simultaneously or consecutively.

In accordance with one embodiment of the invention, a computer-implemented system for audibly conveying financial information includes at least one processor operatively coupled to a data source via a network. The at least one processor is configured to receive at least one user-selected musical parameter, and to receive, from the data source, financial data which is associated with a financial asset and includes a variable parameter over a time period. The at least one processor is further configured to: determine, for a plurality of values of the variable parameter during the time period, a plurality of musical notes based on the plurality of values of the variable parameter and the at least one user-selected musical parameter; and generate audio data associated with the plurality of musical notes. The generated audio data is then processable by a device to audibly produce the plurality of musical notes.

In accordance with another embodiment of the invention, a method for audibly conveying financial information comprises receiving, by at least one processor, at least one user-selected musical parameter, and receiving, by the at least one processor, from a data source operatively coupled to the at least one processor via a network, financial data which is associated with a financial asset and includes a variable parameter which varies over a time period associated with the financial data. The method further comprises: determining, by the at least one processor, for a plurality of values of the variable parameter during the time period, a plurality of musical notes based on the plurality of values of the variable parameter and the at least one user-selected musical parameter; and generating, by the at least one processor, audio data associated with the plurality of musical notes. The generated audio data is then processable by a device to audibly produce the plurality of musical notes.

As further explained in greater detail below, the present invention describes numerous embodiments, features, and variations of the invention, and provides various non-limiting examples of such embodiments, features and variations. Titles and headers are provided for convenience and ease of reading. In accordance with such further embodiments of the invention, the below detailed description and claims provide additional limitations, either in system or process form. It will be appreciated that for each system described and claimed, the invention also includes the methodologies corresponding thereto.

Other objects, advantages, features, and characteristics of the present invention, as well as the methods of operation and functions of related structural elements, and the combination of parts and economies of development and manufacture, will become readily apparent to those of ordinary skill in the art upon consideration of the detailed description with reference to the accompanying drawings, all of which form a part of this specification.

BRIEF DESCRIPTION OF THE DRAWINGS

The drawings are not intended to limit the scope of this invention, which is set forth with particularity in the claims as appended or as subsequently amended, but merely to clarify and exemplify the invention. Accordingly, a further understanding and a more complete appreciation of the present invention and many of the attendant aspects thereof may be readily obtained as the same becomes better understood by reference to the following detailed description, when considered in conjunction with the accompanying drawings, where:

FIG. 3C is another exemplary graphical user interface in accordance with the invention, showing another specific search entry inputted into the search bar, and retrieval of one or more financial assets or categories corresponding thereto;

FIG. 3I is yet another exemplary graphical user interface in accordance with a real-time operation mode of the invention, in which a specific financial asset has been selected, a play button has been depressed, a linear graphical display illustrates current prices of the specific financial asset in real-time, and audible notes are output whose pitch correspond to real-time price or price variations of the specific financial asset.

DETAILED DESCRIPTION OF INVENTION

Figure 1:
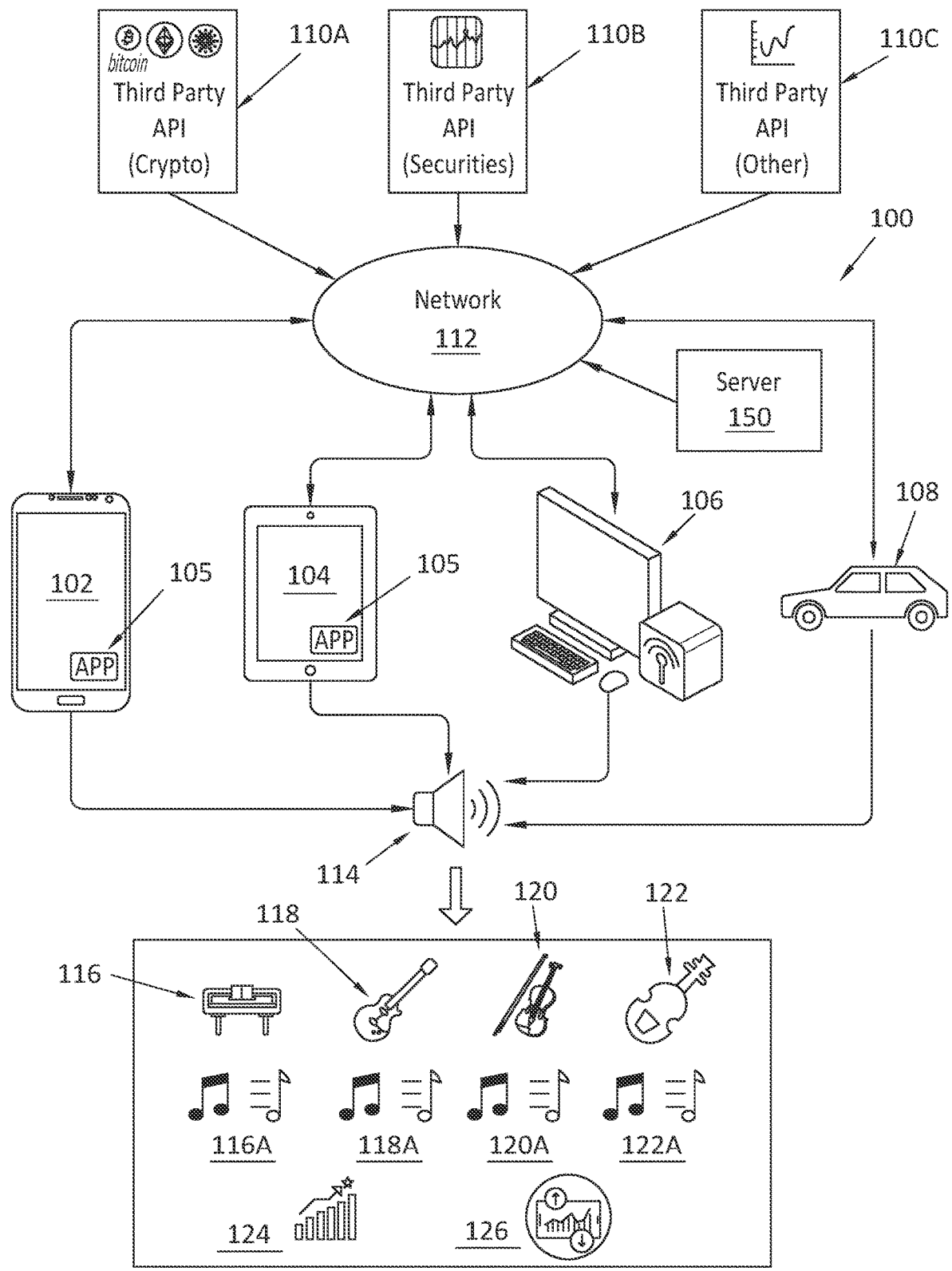
FIG. 1 is a schematic diagram of an exemplary computer-implemented system in accordance with the invention, including a network which operatively couples a server, third party APIs, and a plurality of remote computing devices configured to output audible and visual data or information.

The audible tracking technology and methodology of the present invention provides investors, including those with normal vision and those who are visually impaired, with a tool that is simply unavailable in conventional financial systems—continuous, customized, audible conveyance of financial information associated with price movements of financial assets. The present invention thus creates a new realm of possibilities in the financial sector. By audibly conveying the direction of movement of a financial asset using increasing/decreasing pitches of musical notes, chords, triads, and the like, and/or increasing/decreasing volume thereof, the invention allows users to listen to financial asset volatility or market volatility generally. Allowing investors to continuously or periodically listen to customized notes, chords, or triads with instrument(s) of their choosing within desired volume and frequency ranges and scales is noninvasive, requires minimal concentration, and most importantly, eliminates the need for viewing displays.

As further described below, the present invention can also allow users to cut back their time on conventional financial trading platforms, and to even perform audible Technical Analysis (TA) without looking at a screen. By mapping musical notes or chords of a particular range or scale to coincide/correspond with financial asset price levels over time, and noninvasively conveying audible information to the investor, the invention facilitates a new way for an investor to process financial information—listening to a chart rather than reading it. For example, the invention allows an investor to audibly acquaint himself or herself with conventional chart patterns typically seen visually in conventional TA analysis, and to learn/memorize what such visual patterns sound like audibly so that he or she can recognize that such a pattern is occurring with his or her financial asset(s) in real time without looking at a screen or display.

The present invention can be employed within or by a multitude of electronic devices, smart phones, tablets, computers, televisions, displays, voice recognition devices/technologies, and other such types of electronic devices. The digital content of these devices may include audio-visual content, audio content alone, video content alone, still images, audio files, and the like. The digital content may be presented in different forms, whether historical, live (real-time), downloaded, online, streamed, etc. The invention pertains to computer software and systems which carry out the various processes described herein.

Definitions

The following definitions for terms utilized herein are provided to make clear that these terms are not to be construed narrowly.

The terms "user," "viewer," "listener," "trader," "consumer," "investor," and the like, along with the plural form of these terms, are used interchangeably herein.

The terms "continuous," "continuing," and all grammatical variations thereof are meant to include both constant without interruption and constant with periodic interruptions (e.g., constant but intermittent).

Except where otherwise clear or otherwise stated, the terms "content," "digital content," and the like shall include audio content and, in certain embodiments, represents audio content alone without video content or graphical displays. For example, digital content can refer to, without limitation, an audio creation, an audio-visual creation, a musical compilation, a digital file storing digital content representing audio and/or visual content, audio information, audio recordings, human perceived visual and/or audio content, whether described, displayed, heard, or otherwise perceived.

The terms "touch" and "input" by a user may include any single action or simplified set of actions perceived by a mechanical, electrical, optical, audio, or computing device, such as a "click" on a mouse, depression of a button, a selection or depression of a key on a keyboard or keypad (including a virtual keyboard or keypad), a contact on a touch-screen type device, a voice command received by a user, a voice command received by a user with the assistance of an appropriate computing device, and a physical gesture also received by an appropriate computer device (e.g., devices employing a camera, touchscreen, or other types of sensors that detect movement). These are non-limiting examples.

The types of devices that can receive a touch, single operation, or other form of input by a user include, as non-limiting examples, a keyboard, touchscreen, mouse, input device of a computer, smart phone, tablet or other mobile electronic device, a remote control, key fob, camera system coupled to a suitable computing device, computing system that employs a microphone, movement/motion sensors, optical systems, and devices/systems that include a combination of any of the foregoing.

The term "smart phone" as used herein includes smart tablets and other like portable electronic devices as well as smart watches and other portable devices capable of wireless communication with other electronic devices.

The term "display" includes both portable and non-portable video monitors capable of displaying (or projecting) visual content and/or audio-visual content, and includes such electronic devices regardless of their size, placement, and method of mounting (if mounted).

The terms "speaker," "microphone," "audio device," and the like each include both portable and non-portable audio devices capable of receiving and/or playing audio content and/or audio-visual content, and includes any such devices and electronic devices regardless of their size, placement, and method of mounting (if mounted).

The term "financial asset" includes, but is not limited to, stocks, soft and hard commodities, bonds, cryptocurrencies, fiat currencies, equities, securities, or any other type of asset of value.

The term "financial asset category" refers to a category or group of certain financial assets in one or more markets, such as, for example, the Dow Jones Industrial Average (DOW).

The Audible Tracking System

Figure 1A:
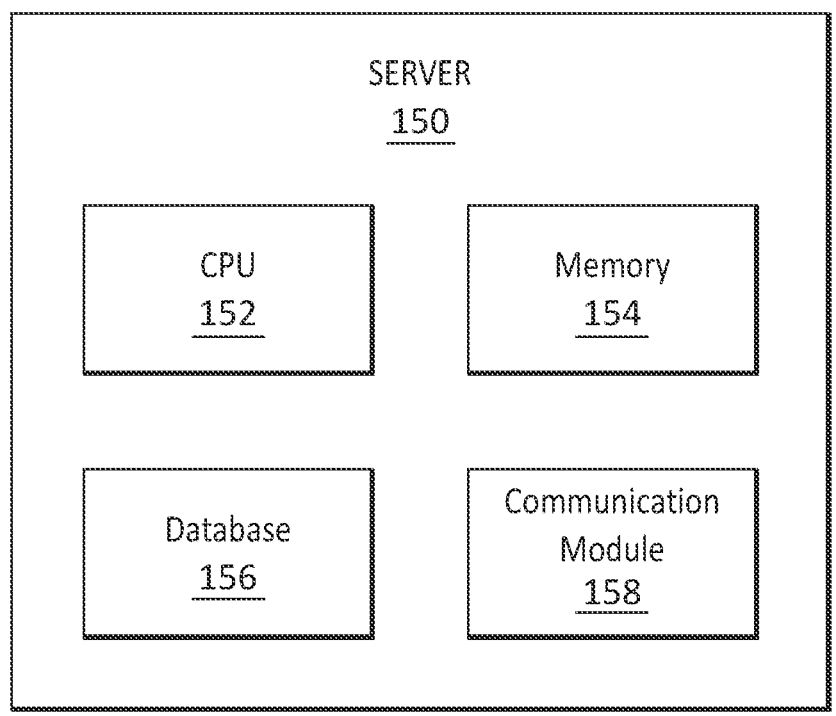
FIG. 1A is a schematic diagram of the server of FIG. 1.

The present disclosure is not intended to be limited to the specific terminology selected, and it will be understood that each specific element of system 100 of the invention, schematically depicted in FIGS. 1 and 1A, includes all technical equivalents which operate in a similar manner. Techniques, methods, systems, and operating structures in accordance with the invention may be embodied in a wide variety of forms and modes, some of which may be quite different from those in the disclosed embodiments. Consequently, the specific structural, functional and step-by-step details disclosed herein are merely representative. The embodiments herein are described in sufficient detail to enable those skilled in the art to practice the embodiments, and it is to be understood that logical, mechanical, and other changes may be made without departing from the scope of the embodiments, and that the description herein is not to be taken in a limiting sense.

Each element in flowcharts shown or methodologies described herein, such as the methodologies shown and described with respect to FIGS. 2 and 3A-3I, depict a step or a group of steps of a computer-implemented system and methodology in which financial information is processed and converted into both graphical and audible form, and conveyed visually in one or more graphical user interfaces and/or audibly through audible notes, chords, triads, and combinations thereof. The systems and methodologies described herein may be utilized through a mobile app, a website accessible by a web browser, or through any other suitable means. Each step of methodologies described herein may contain one or more sub-steps. For purposes of illustration and explanation, these steps, as well as all other steps identified and described, are presented in a certain logical order. However, it will be appreciated that any exemplary embodiments described herein can contain an alternate order of the steps adapted to a particular application of a technique disclosed, and that any such variations and/or modifications are intended to fall within the scope of the invention. The depiction and description of steps in any particular order is not intended to exclude embodiments having the steps in a different order, unless required by a particular application, explicitly stated, or otherwise clear from the context.

It will be appreciated that various modules of the systems, platforms, and methods described herein may be implemented by using an interfacing mobile app on an internet enabled mobile device's operating system, such as, for example, Android, iOS, or Windows Phone OS, and in part by using a web interface, and that different types of users may utilize different functionalities. Systems described herein may include implementations through a combination of hardware and software that operate on a stationary or portable computing device, and may comprise various pre-programmed features combined and integrated with basic components, including but not limited to, one or more servers, databases, mobile end applications, web portals, network settings, etc. With the support of these components, the system provides the services and functionalities through user interfaces such as a website or mobile applications.

The system may have more than one server in a distributed structure with support from data centers located anywhere in the world. Implementations may be communicatively linked and cross-platformed so that a user may be provided with financial information relevant to his or her inquiry. The system may function on more than one computer architecture, operating system, application software, application programming interface (API), web application, etc. It will be appreciated that computer program instructions used by systems described herein and/or the apps for use with the system may include computer executable code in one of a variety of languages, including C, C++, Java, JavaScript, etc., and that all system components and system processors may be operatively coupled or operatively associated with one another wirelessly, via hardware, software, and/or through cloud-based computing.

Referring now to FIG. 1, a schematic diagram of an exemplary computing system 100 includes a server 150, a plurality of peripheral remote user computing devices, including a smartphone 102, a tablet 104, a personal PC 106, and one or more motor vehicle computing devices 108, as well as one or more third party APIs 110A, 110B, 110C, in communication with server 150 via network 112 for use with various exemplary embodiments of the invention. A combination of hardware and software operates on computing devices 102, 104, 106, 108 (hereafter '102-108') and computing system 100 generally, with one or more connections to wired or wireless network 112 (e.g., a wide area network (WAN) such as the Internet, a cloud-based network, etc), incorporated with local devices through a local area network (LAN) interface (not shown), and/or through or in conjunction with any future technologies for communicating data.

As shown in FIG. 1A, server 150 may include central processing unit or control unit (CPU) 152, which executes programs stored in memory 154 to perform various types of processing, and transmits and receives data to/from user computing devices 102-108 through network 112 via server communication module 158. Memory 154 may include, for example, a hard disk drive or a memory such as R.A.M., and may store various programs. Server 150 may also be configured to function as a general server, and may work in conjunction with third party APIs 110A, 110B, 110C to provide various functionalities described herein.

Server 150 may also include database 156 for storing user registration data, historical data, real-time data, user-specific audio content and visual content; data received from user devices 102-108, and data received from third party APIs 110A, 110B, 110C. Such stored information can include, by way of example and without limitation, user profile data, names, addresses, phone numbers, associated devices, IP addresses, past and present financial asset inquiries, user communications, graphical displays, musical compilations, musical creations, one or more user customized parameters or settings for each user; NFT related data, user-specific tokens, user settings, and audible data associated with various audible outputs responsive to user inquiries, passwords, preferences, and customizable features associated with various system functionalities described herein.

System 100 can include one or more of such servers 150 in communication with computing devices 102-108 and third party APIs 110A, 110B, 110C via network 112. As discussed above, user devices 102-108 can be any form of user computing device, such as a mobile phone, a smartphone, a laptop computer, a desktop computer, a tablet, and the like, or may be any future technologies for communicating data. User devices 102-108 can include one or more graphical display screens, microphones for receiving audible input, speakers 114 for outputting audible output, a central processing unit, a clock or time device, GPS technology, and a communication module for communicating with network 112 and associated servers.

In certain embodiments, mobile user devices 102, 104 include a downloadable app 105, which the user launches to view various graphical user interfaces associated with system 100 during an initial setup period, and to set customizable features during use and operation of system 100. In certain embodiments, the user device is simply a terminal, and some or all of the functionalities of the various components described herein are provided to the user by a remote computing device such as a CPU of one or more servers, a cloud-based server or memory, one or more displays, and one or more audio devices.

Third party APIs 110A-110C deliver financial information (e.g., real-time and/or historical price information) to system 100 about various types of financial assets. For example, API 110A provides system 100 with real-time and historical price information for various cryptocurrencies (e.g., Bitcoin, Ethereum, Cardano, or any other of the thousands of cryptocurrencies) by communicating any publicly available data associated therewith (e.g., current or historical price data), and/or communicating proprietary nonpublic data. API 110B provides system 100 with real-time and historical price information for equities or securities 110B by communicating any publicly available data associated therewith (e.g., current or historical price data) and/or communicating proprietary nonpublic data. API 110C similarly provides system 100 with real-time and historical price information or other data for commodities by communicating publicly available data and/or proprietary nonpublic data obtained from entities or other third-party APIs. System 100 may receive data from other or additional APIs, and thus, is configured to receive data of any type, public or private, that communicates relevant data to users. In certain embodiments, nonpublic, proprietary data received by system 100 is customer-based and restriction-based, and received from brokerage firms, trading platforms, and the like (e.g., Coinbase®, Vanguard®, etc).

As schematically shown, each user device 102-108 is configured to emit audible sound via a respective microphone 114. The audible sound may be one or more of a piano 116, guitar 118, violin 120, cello 122, and/or any other instrument or musical device, such as bells, drums, a guitar, a mellotron, an organ, or any combination thereof. The audible output may comprise musical notes, chords, or triads 116A-122A corresponding to one or more of instruments 116-122. In certain embodiments, system 100 is also be configured for layering of notes, harmonizing, polyphony, and allowing a user to select Midi (Musical Instrument Digital Interface) technology to add other additional musical effects, such as, for example, echo and accompaniment instruments which play simultaneously and create fuller and more distinct sounds.

As further discussed below, in certain embodiments, musical notes 116A-122A emitted by speakers 114 of user devices 102-108 correspond to the price of a tracked financial asset received by system 100 over time from one or more of APIs 110A, 110B, 110C. New notes are periodically emitted by speaker 114 after a time interval requested by the user has elapsed (or by a default or preset time interval), and at a pitch and/or volume which changes in accordance with the price change of the tracked financial asset or category.

System Operation Modes

The following is an overview and explanation of the operation of system 100 in both a real-time mode and in a historical mode. More specific illustrative methodologies which employ system 100 are then described with respect to FIGS. 2 and 3A-3I. During operation of system 100 in real-time and historical modes, a user can monitor his or her financial assets audibly, and even engage in audible technical analysis. Indeed, the series of notes emitted by speaker 114 of one or more of remote computing devices 102-108 of system 100 over time correspond to the price action of a financial asset, which would otherwise be displayed visually via charts 124, 126 (FIG. 1). If desired, such charts 124, 126 may also be visually displayed on one or more display screens of user devices 102-108. The audible financial information delivered by system 100 in the form of musical notes, chords, and triads allows investors to stay informed of financial asset price changes without visual attention thereto, and without having to hold or view any devices.

Real-Time Operation Mode

System 100 is configured for operation in a real-time operation mode by a user/investor who wishes to audibly receive real-time financial information about a financial asset during market hours (e.g., while the financial asset is being bought and sold on open public market exchanges). In this mode, system 100 prompts the investor to specify a particular percentage change, such as a quarter of one percent (i.e. +/−0.25%) in the price of the financial asset at which system 100 will change the pitch of the note played. Alternatively, system 100 can be preconfigured to automatically assign this percentage.

System 100 can also be configured to play each new note with an increase in pitch by, for example, one full note on a musical scale, when the price of the financial asset being tracked moves upward by the preset or automatically set percentage change (in this example, 0.25%) relative to its price at the time the last note was played. System 100 may be similarly configured to play each new note with a decrease in pitch by one full note on the musical scale when the price of the financial asset moves downward by 0.25% relative to the price at the time the last note was played. The initial note played by system 100 can be, for example, middle C. In certain embodiments, this note (middle C) is set as the note corresponding to the price of the financial asset at the time the user begins listening to its price movement in real-time. In certain embodiments, the audibly played notes are set to increase or decrease in pitch from a commonly known musical center, such as middle C. It will be appreciated that using middle C as the starting note make it easier for a user to audibly follow/track the financial asset.

In certain embodiments of the invention, the financial asset price corresponding to middle C is readjusted as needed in times of extreme financial volatility (e.g., if the price swing of a financial asset in real-time exceeds the corresponding musical range of the full scale being utilized). In certain other embodiments, system 100 is configured to determine an average price over a small time period as the basis for the pitch of the musical note to play. In yet other embodiments, the preset percentage (e.g., 0.25%) of the price change which triggers a note change corresponds to a fractional note change (e.g., a half note).

Given that a piano has a musical range of seven octaves, in one exemplary embodiment, system 100 is configured to map a financial asset's price variation to a musical range such that one full octave corresponds to a 2% financial asset price change, whereby the seven (7) octave musical range of a piano corresponds to an approximately 14% variance (+/−7%) in price of the financial asset. Other ranges and percentages of financial asset price changes which trigger musical note changes may be utilized.

By way of example, in certain embodiments, system 100 is configured to set the four octaves of the piano above middle C as the musical range of the top half of the price range (e.g., the estimated price range in a real time operation mode and a calculated price range in a historical operation mode) of a financial asset, and the three octaves below middle C is set as the musical range of the bottom half of the price range. In yet other exemplary embodiments, system 100 is configured to use twenty-five (25) triad notes for the top half of the price range and nineteen (19) triad notes for the bottom half of the price range. If the upper or lower limit of the musical range set by system 100 is exceeded due to extreme asset price volatility, then system 100 may be configured to reset the audible note played to middle C as described above, with or without a notification to the user.

In yet other embodiments, the initial note played for the user is set to another note on the musical scale other than 'C' (e.g., A, B, D, E, F, G). Other price change percentages may also be preset as the threshold for changing the pitch of the note played (e.g., 0.5%, 1.0%, 1.5%, 2%, 2.5%, 3%, 5%, 10%, etc.) as desired by the user. It will be appreciated that the larger the price change percentage that is set, the less frequently the tone of the note will change for a given volatility level of the price of the financial asset.

In certain embodiments, system 100 is configured to receive an input from the user/investor indicative of how frequently the user/investor desires the notes to play (e.g., fractions of a second, such as half, quarter, or eighth of a second, multiple seconds, a minute, etc.), and for how long each note should play. It will be appreciated that if the price of the financial asset has barely moved after the elapsed time period set by the user (e.g., the time period between notes), then system 100 will simply play a note of the same pitch, or the same chord or musical triad, for the user. If the price of the financial asset increases or decreases by the requisite percentage (e.g., 0.25%), then system 100 may play a new note which is one note higher or lower in pitch, respectively, or a new chord or musical triad with each note of the chord or musical triad incremented higher or lower in pitch by one full note or a partial note. Other increments of notes (e.g., half notes) may be utilized.

In yet other embodiments, system 100 is configured to audibly output the actual price of the financial asset instead of, or in addition to, the particular note, chord, or triad of notes corresponding to the price. For example, for the visually impaired, the actual price may be audibly conveyed in time increments of the user's choosing, and/or when the price of the financial asset reaches certain levels. System 100 can also be configured to periodically audibly convey identifying characteristics of the financial asset (e.g., the name of the company, the ticker symbol, a familiar jingle or tone associated with the company, etc.) for which musical notes are played.

Historical Mode

System 100 is also configured for operation in a historical mode by a user/investor who wishes to view or listen to the price movement of a financial asset over a historical time period (e.g., not in real-time). The investor can input the historical time period (e.g., multiple days, a week, multiple weeks, a month, a year, etc.) over which the investor wishes to view or listen to the financial asset's movement. System 100 is configured to retrieve financial information from one or more of APIs 110A-110C for the inputted time period, and to determine the low price and the high price of the financial asset during this inputted period. System 100 then calculates/determines the amount of the price range of the financial asset between the start and end of the inputted time period (e.g., the high price minus the low price), and maps a range of musical octaves to the calculated range between the high and low prices. In certain embodiments, system 100 is also configured to set the beginning price (i.e., the price of the financial asset at the beginning of the inputted time period) to middle C, and to begin inflections in notes from there.

In both the real-time and historic operating modes of system 100, various types of musical scales may be utilized, and may be preset by the user or automatically set by system 100. Such scales may be, for example, chromatic or dodecatonic (12 notes per octave), nonatonic (9 notes per octave), octatonic (8 notes per octave), heptatonic (7 notes per octave—the most common modern western scale), hexatonic (6 notes per octave), pentatonic (5 notes per octave), tetratonic (4 notes), tritonic (3 notes), and ditonic (2 notes). Additionally, if desired, two or more octaves (higher or lower) with repeating scales may be utilized and mapped to whichever price range or potential price range is contemplated, and ordered by increasing or decreasing pitch class.

The musical range assigned by system 100 may comprise, for example, all of the notes of an eighty-eight key piano, including seven octaves plus three additional keys below bottom C. A seven octave range may also be utilized when system 100 is operated in the real-time mode. It will be appreciated that, for example, when 0.25% is set as the price percentage change corresponding to a full musical note change, a 1% change in price will correspond to a change of four full notes in the audible output of system 100, and a 20% variance of the price range (e.g., +10% to −10%, +13% to −7%, −5% to +15%, etc.) in a financial asset over time will correspond to eighty full notes (20/0.25).

In certain embodiments, when system 100 is operated in a real-time mode, and the variance of the asset price is high enough to exceed the corresponding seven octave range of a piano, then system 100 is configured to reset the note played back to middle C (e.g., middle C is then mapped to correspond to the current price rather than the opening or starting price). This prevents notes from getting too high or too low in pitch to create unpleasant sounds to the user, and to prevent the pitch from reaching levels outside of the audible range. System 100 may alternatively be configured to allow uncomfortable sounds as these may be indicative of potential action needed by the investor, and function as better notifications. System 100 may also be configured to notify the investor with one or more tones, flashes of light, vibrations to user devices 102-108, an increase in volume of the notes played, etc., when potential action by the investor is needed (based on the financial asset's price reaching a particular level).

By way of example, in certain embodiments, system 100 is configured to alert a user of an actionable move, a pivot point prior to a financial asset's price reaching a predetermined action point, a trailing stop, a breakout point, a level of resistance, a support level, a top, a bottom, a displaced moving average (DMA), a swing trade level, supply and demand zones, etc, or any other noteworthy point typically analyzed in conventional technical analysis. System 100 retrieves this information from APIs 110A-110C or other third party APIs whose software performs these analyses.

Upon receiving such notifications, the investor may decide to then follow/track the financial asset visually and/or execute a trade on a conventional trading platform.

Using Historical Mode For Learning Audible Technical Analysis (TA)

By scaling musical notes or chords of a particular range or scale to coincide with financial asset price levels over time, the invention encourages an entirely new way for an investor to process financial information—chart listening rather than chart reading. For example, the invention allows an investor to audibly acquaint himself or herself with conventional chart patterns which are typically seen visually (e.g., chart patterns known and visually observed in conventional TA analysis).

By way of example, it will be appreciated that in certain embodiments, system 100 may be operated to allow users to map musical notes to conventionally known visual chart patterns which happen to arise during historical or real-time operation of system 100. Such chart patterns include, but are not limited to, a double top, a double bottom, a head and shoulders, a rising wedge, a falling wedge, continuation patterns including pennants with two converging trendlines, flags, symmetrical, ascending, and descending triangles, reversal patterns, bullish continuation patterns such as a cup and handle, triple tops, breakaway, runaway, and exhaustion gaps, and any other type of visual chart pattern. Using system 100 in the historical mode, the user can then repeatedly listen to the mapped musical notes, chords and/or triads corresponding to a particular chart pattern, learn the patterns of sound corresponding thereto, and thus, subsequently audibly recognize future chart patterns (e.g., price patterns) traversed by financial assets as they later occur in real-time.

An investor may decide, based on audibly received financial information during real-time operation of system 100, whether he or she wishes to then log into or otherwise access a conventional financial trading platform, review the price of the financial asset, and buy or sell it at verified price levels. Examples of conventional online trading platforms are disclosed in, for example, U.S. patent application Ser. No. 15/232,749, filed on Aug. 9, 2016 and titled System And Method For Conducting Web-Based Financial Transactions In Capital Markets, which is hereby incorporated by reference herein in its entirety. In certain embodiments, the investor may also preset particular chords, tunes, chart tones, or songs to play when particular price levels are reached or when particular chart/price patterns occur. System 100 may also be configured to notify the user with customized alerts during periods of high volatility (or at any time the user's preset levels are approached). The user may wish to then manually make the trade instead of relying on his or her preset trades, which may not otherwise be automatically executed if the particular pre-set price level is not reached or if the automatic pre-set trade is not honored during periods of high volatility.

Overall Methodology

Figure 2:
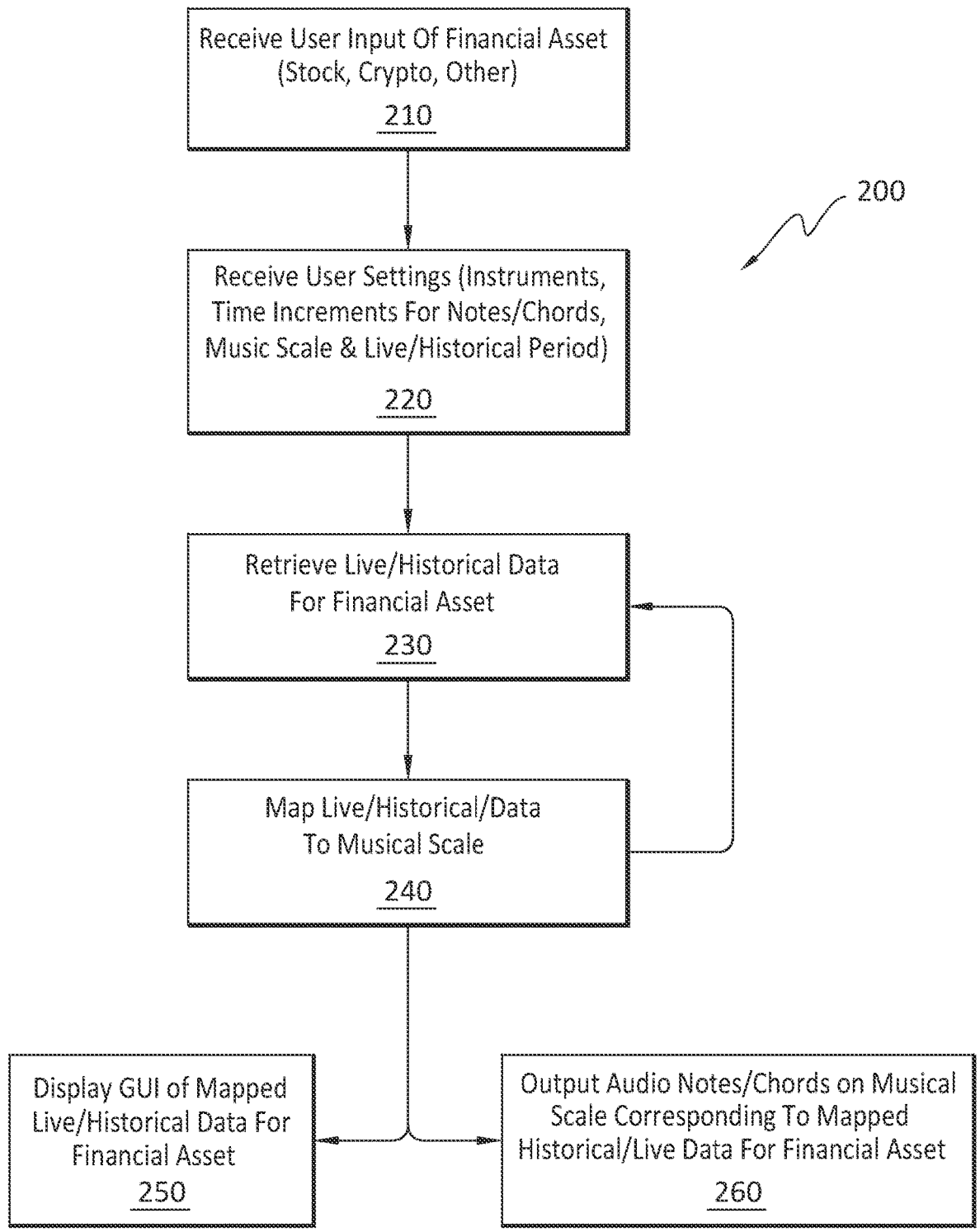
FIG. 2 is a flowchart of an exemplary methodology of the computer-implemented system of FIG. 1, in which financial information is processed and converted into both graphical/visual and audible form, and conveyed in one or more graphical user interfaces and/or audible notes, chords, triads, and combinations thereof for audible monitoring of financial assets, in accordance with the present invention.

Referring now to FIG. 2, an exemplary overall methodology 200 for using audible tracking system 100 to audibly monitor the price of a financial asset is schematically shown. At Step 210, system 100 receives one or more user inputs to determine the exact financial asset the user desires to track. At Step 220, system 100 receives additional inputs (e.g., musical parameters) from the user indicative of, for example, the particular instrument(s) the user desires for the notes, the time increment to use to periodically play the notes which function as audible notifications of relative price changes, the length of time to play the notes, the particular musical scale, the number of octaves for system 100 to utilize as the musical range to which the financial asset prices are mapped, the price percentage change which will trigger a note change, the amount/scale of the note change, and any other user-customizable musical parameter described herein. Additionally, if system 100 is operated in the historical mode, the user enters a historical time period over which to analyze the financial asset's prices. Such inputs may be inputted by the user via various graphical user interfaces displayed on devices 102-108 (further described below with respect to FIGS. 3A-3H), via microphone 114, or via any ADA compliant on-line web-based feature.

At Step 230, once system 100 has inputted the particular financial asset the user wishes to track, system 100 retrieves, from one or more of APIs 110A-110C, historical and/or real-time financial information (e.g., price information) for the financial asset. At Step 240, system 100 maps the received financial information to the musical range (based on the particular scale and the number of octaves utilized) as described above.

For example, if system 100 is operating in a historical operation mode (e.g., a year, month, or week time-frame is selected by the user), then system 100 ascertains the spread of the price range (between and inclusive of the high price and the low price), and maps this price range onto the musical range of notes (e.g., establishes a correspondence between the total dollar change of the price of the financial asset and the total number of notes in the musical range). If the price range over the historical time period is $40 and the musical range is forty notes, then a $1 change in price may correspond to a change in pitch of one note within the forty-note range.

In this historical operation mode, the investor may be interested in listening to and learning a particular audible pattern corresponding to a visible chart pattern representative of the price action of the financial asset. Users may thus utilize the historical operation mode of system 100 for any number of reasons, including getting familiar with system operation, practicing chart listening, learning audible equivalents or general audible patterns of visible chart patterns, and looking for potential musical compositions created by the user's various customized parameters and the resulting audio output created thereby. In other words, the user's set up parameters combined with the user-selected time period over which the set-up parameters apply result in the creation of music which the user may wish to save as an audio file and/or use as an identifier. A user may also enjoy keeping a musical representation of a particular trade (and how that trade unfolded over time). In certain embodiments, system 100 is configured to store this digital content in database 156.

If system 100 is alternatively operated in a real-time mode (e.g., during trading hours and 'day' is selected as the time frame), then system 100 also loops back to Step 230 to retrieve additional real-time (i.e., live) financial asset information/data from third party APIs 110A, 110B, 110C depending on the particular financial asset being tracked.

At steps 250 and 260, system 100 outputs a graphical display (e.g., a chart) on a display screen of user devices 102-108 corresponding to the mapped historical and/or live data for the financial asset. System 100 also outputs, via the remote device of the user (e.g., one or more of devices 102-108), audio notes, chords, or musical triads on the musical scale at a particular octave, and varies the pitch as the prices of the financial asset changes over time. As described above, the volume of the notes played may also be increased or decreased depending on whether the financial asset is at, above, below, or approaching a level at which the investor wishes to take action (e.g., buy or sell) on the financial asset.

It will be appreciated that during real-time operation, when the volume of musical notes played is low, the sound of the musical notes may be just at the periphery of the investor's consciousness, whereby the investor can tune them out if needed and only focus on the audio output if he or she chooses to do so. If the pitch and/or volume of the musical notes significantly change over a short time period, then the investor is more likely to be alerted to and focus on what is happening.

By providing an alternative to visual charting, system 100 allows an investor to monitor one or more financial assets (and thus monitor the status of one or more previously made trades) audibly. Simply listening to the trade during the day allows the investor to do other daily activities while staying within earshot of his or her user computing device in case any trading actions are needed. It will be appreciated that wireless headphones, Bluetooth, etc., may be used in conjunction with system 100 to further facilitate hands-free chart listening of financial assets by system 100.

As noted above, in certain embodiments, the audible tracking technology of the present invention can be used in conjunction with conventional technical analysis methodologies by noninvasively conveying information to the investor at times when financial asset tracking would be otherwise unfeasible. Such information may include, for example, audible indications that an asset is approaching a Fibonacci retracement level (a potential price inflection point), or any other level in which the investor is interested. An investor driving to or from work, shopping for food in a supermarket, reading or studying in a library, etc., can audibly follow financial assets/trades historically and in real-time. The audible indication that the asset is approaching a particular price level of interest may be in the form of, for example, one or more distinctive musical notes, chords, action tones, jingles, bells, whistles, sirens, notes, Gregorian chants, acapella singing, or any other distinctive audible sound or musical vocalization. Similarly, the price level of the financial asset may be conveyed to the user in any of these audible forms, using changes in pitch and/or volume as the price changes.

For example, in certain embodiments, system 100 is configured to play separate audible notifications (e.g., changes in volume or a more pronounced increase or decrease in the pitch of musical notes played) for the investor when the price of a financial asset approaches the investor's preset buy or sell limit (e.g., preset based on the investor's own technical analysis and/or the technical analysis of other investors or software). The investor can customize how he or she wishes to receive such audible information, including, for example, by increasing or decreasing preset time intervals over which notes/chords corresponding to price are played, increasing the volume or time duration of the audible output as the financial asset's price approaches a particular preset limit, and in a real-time mode of operation, increasing or decreasing the percentage change in price required to change the pitch of the note played or the chord or musical triad played on the musical scale.

It will be appreciated that the capabilities of system 100 described herein will improve upon the current practice of many retail traders who merely check their smartphones at random times throughout the day, which causes them to miss investment or trading opportunities. By continuously and audibly providing investors with real-time financial asset information, the invention allows investors to trade more confidently over longer time horizons without constant visual monitoring. The audible tracking system of the invention can also be used, for example, at work or during recreational activities, such as while preparing a meal, shopping, driving, on a boat, at the beach, or even while resting.

It will also be appreciated that by incorporating an additional one of the senses (i.e., hearing) into financial analysis/tracking (a process typically done visually), the invention may improve a user's learning, understanding, and comprehension, and may even improve/sharpen the user's cognition with respect to financial trading. Additionally, by audibly tracking one or more financial assets, visually impaired users who are no longer able to see a chart on-screen may be better able to nevertheless mentally visualize or follow asset movements and/or recognize chart patterns occurring in real-time by chart listening.

Exemplary Methodology With Graphical User Interfaces

Referring now to FIGS. 3A-3I, exemplary graphical user interfaces are shown through which an investor can customize various features discussed herein, and use system 100 in the real-time and historical modes of operation for chart listening to a financial asset or an index representative of the market more broadly. An investor can also use these particular interfaces to learn audible patterns corresponding to conventional chart patterns as described above.

An initial graphical user interface 300 (FIG. 3A) is provided by system 100 on user devices 102-108, either when app 105 is launched from a mobile remote computing device, or via a website the user accesses directly online via a PC or mobile device (mobile web). Graphical user interface 300 includes a search window 302 which queries the user to enter a search ticker (e.g., a stock ticker symbol), company, or profile. A window 304 is also provided for a user to enter his or her email address for registration purposes and/or to receive a newsletter.

Figure 3A:
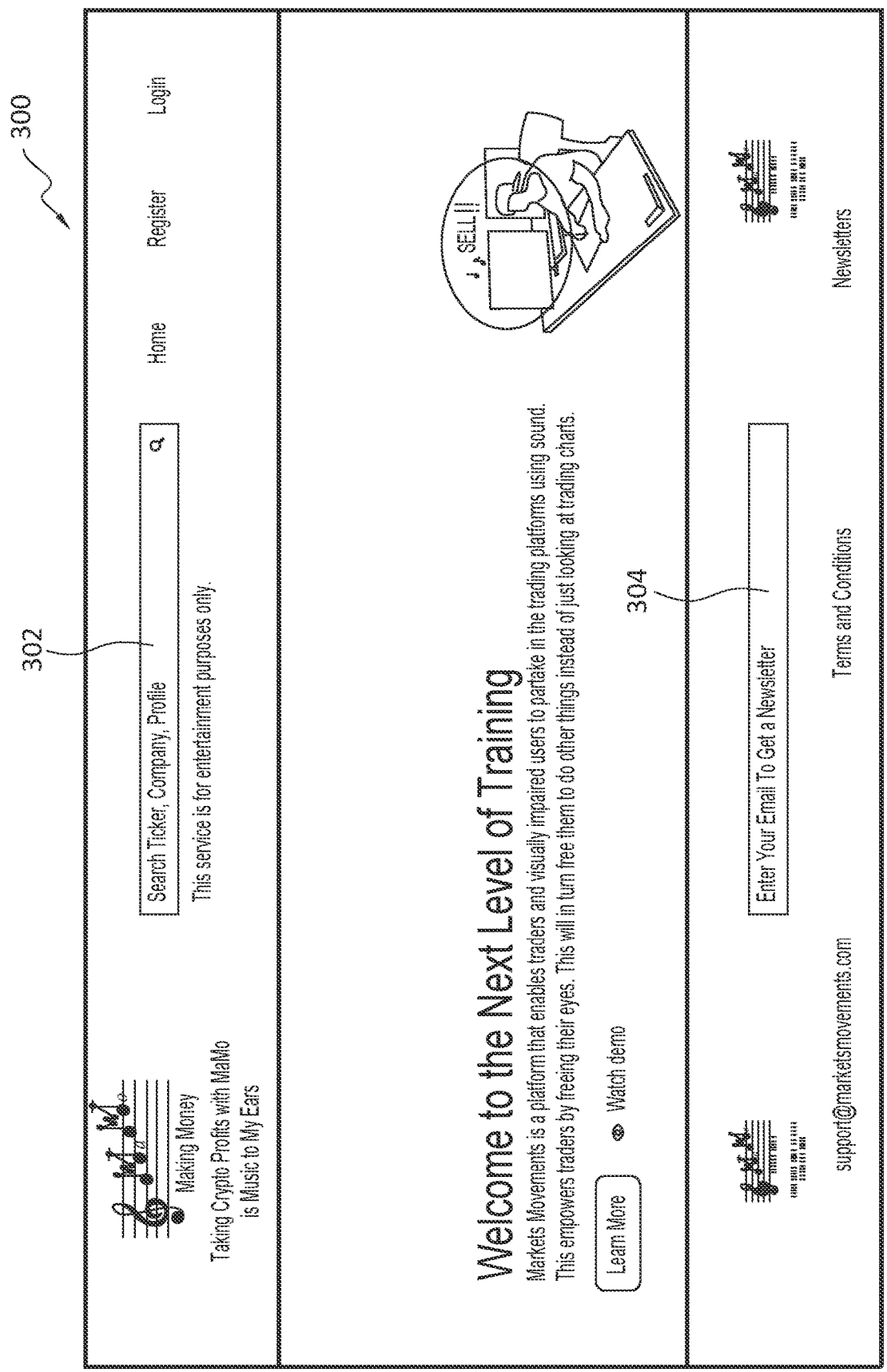
FIG. 3A is an exemplary graphical user interface in accordance with the invention, showing various search bars and buttons for inputting or obtaining user information and searching for a particular financial asset or category.
Figure 3B:
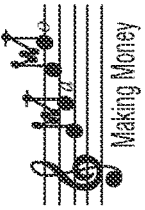
FIG. 3B is another exemplary graphical user interface in accordance with the invention, showing a particular search entry inputted into the search bar, and retrieval of one or more financial assets or categories corresponding to the inputted search entry.
Figure 3D:
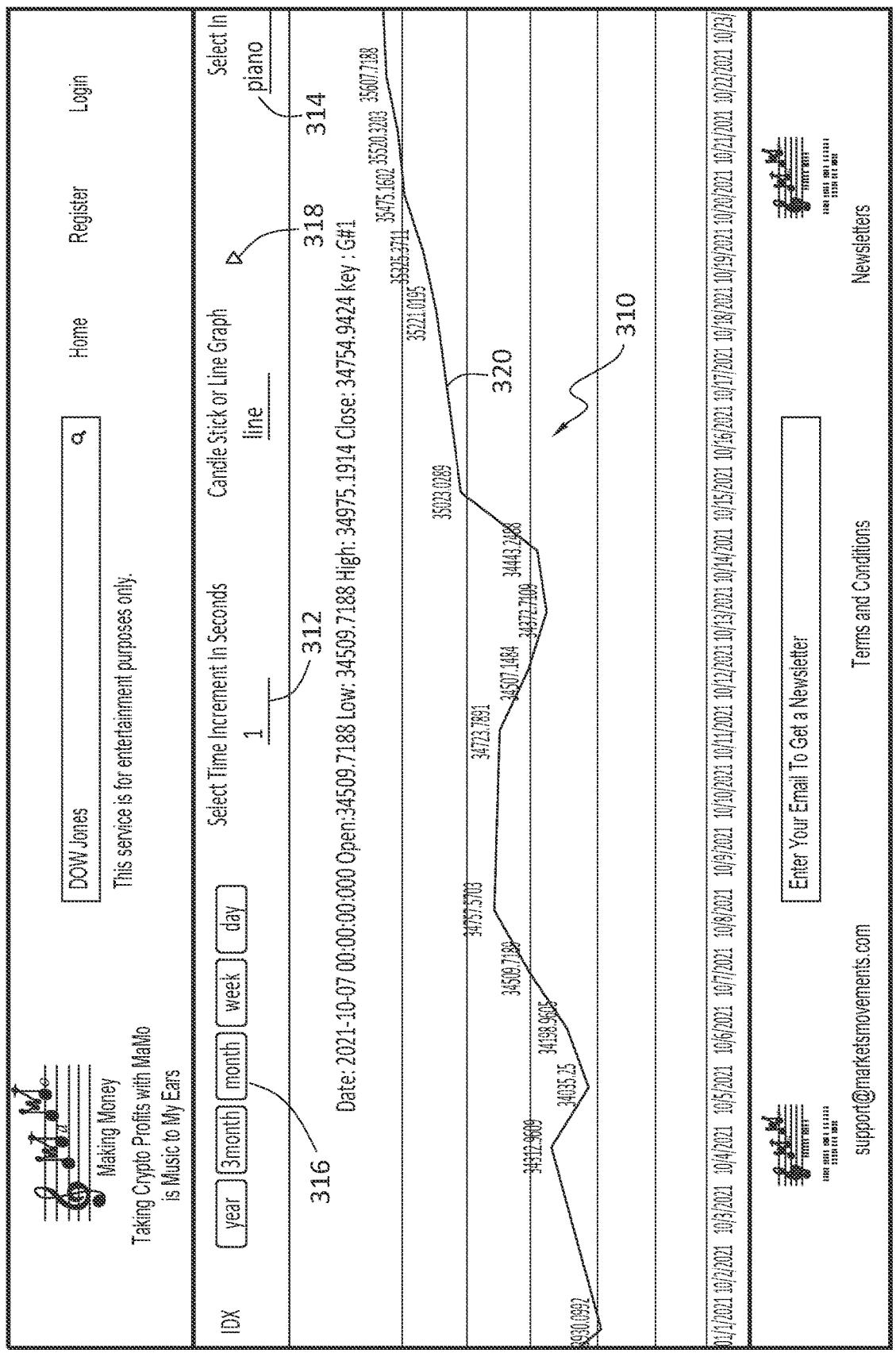
FIG. 3D is yet another exemplary graphical user interface in accordance with a historical operation mode of the invention, showing a graphical display of a financial asset or category over a selected or preset time period, and various customized options for selecting time increments, a menu of particular instrument(s), and one or more selectable historical time periods over which to retrieve financial data and audibly convey information.
Figure 3E:
FIG. 3E is the exemplary graphical user interface of FIG. 3D, in which a time increment dropdown menu has been selected.

As shown in FIG. 3B, 'DOW' has been entered in search window 302, and a list/menu 306 of selectable options appear which contain 'DOW.' When 'DOW Jones' is entered into search window 302 (FIG. 3C), list 306 is updated, and one of the potential selections is now the "Dow Jones Industrial Average." Upon selection of this option, a new graphical user interface 310 is generated (FIG. 3D) that contains selectable customizable options, including a time increment pull down menu 312, an instrument selection menu 314, a time horizon menu 316, and a 'play' button 318. As shown, time horizon menu 316 includes options for a year, three months, a month, a week, and a day. In FIG. 3D, 'month' has been selected, and a linear graphical display 320 visually shows price changes of the DOW over that period. A candlestick graphic display may also be provided. The investor can select the time increment 312 (e.g., how often notes are to be played) from drop down menu 322 (FIG. 3E). Here, one second is selected as the time increment. While menu 322 shows a number of time increment options between one second and forty seconds, other smaller or larger time increments may be utilized, such as, for example, fractions of a second (e.g., ¼, ½, ¾), minutes, or hours.

Figure 3F:
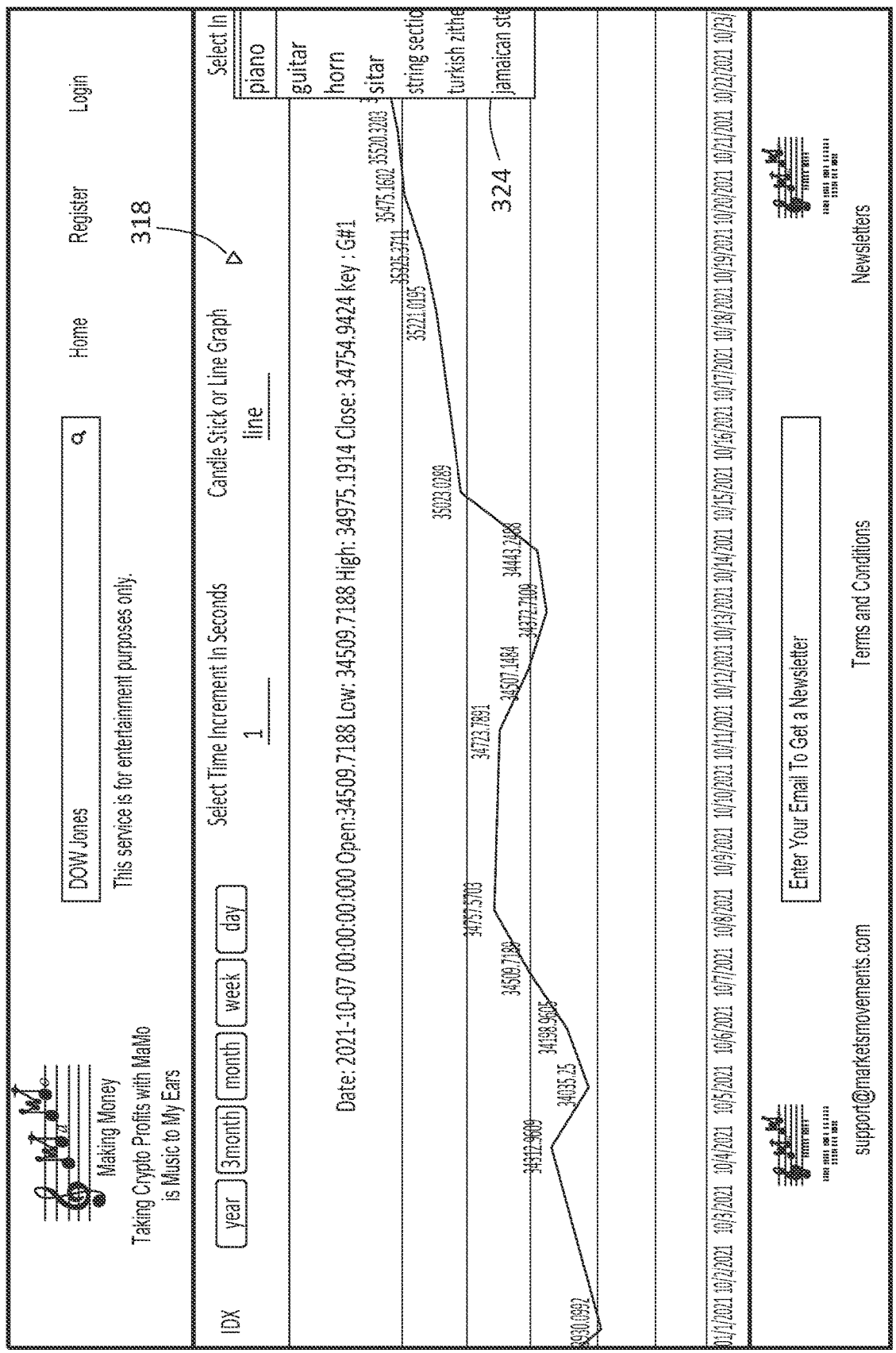
FIG. 3F is the exemplary graphical user interface of FIG. 3D, in which a musical instrument dropdown menu has been selected.

As shown in FIG. 3F, the investor can also select a particular instrument from a plurality of instruments via drop down menu 324, including piano, guitar, horn, sitar, string section, Turkish zither, and Jamaican steel drums. Other instruments may be used, and multiple instruments (e.g., two, three, four) may be configured to play simultaneously to give the outputted musical tones a broader, fuller sound.

Figure 3G:
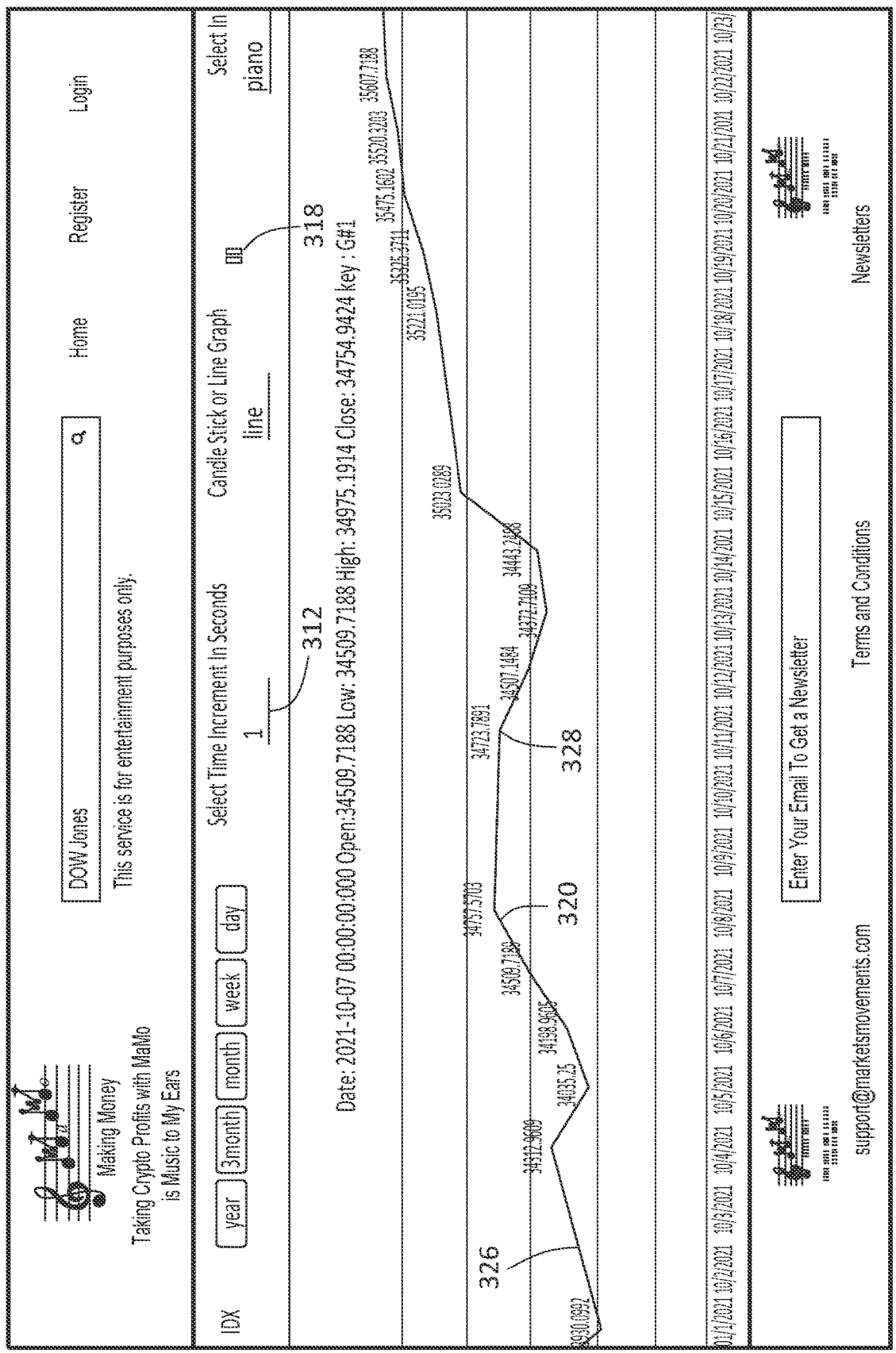
FIG. 3G is the exemplary graphical user interface of FIG. 3D, with a play button depressed, partial shading of a visibly displayed historical price chart, and visual depiction of a portion of the historical price chart for which audible notes corresponding thereto have already been audibly communicated to a user.
Figure 3H:
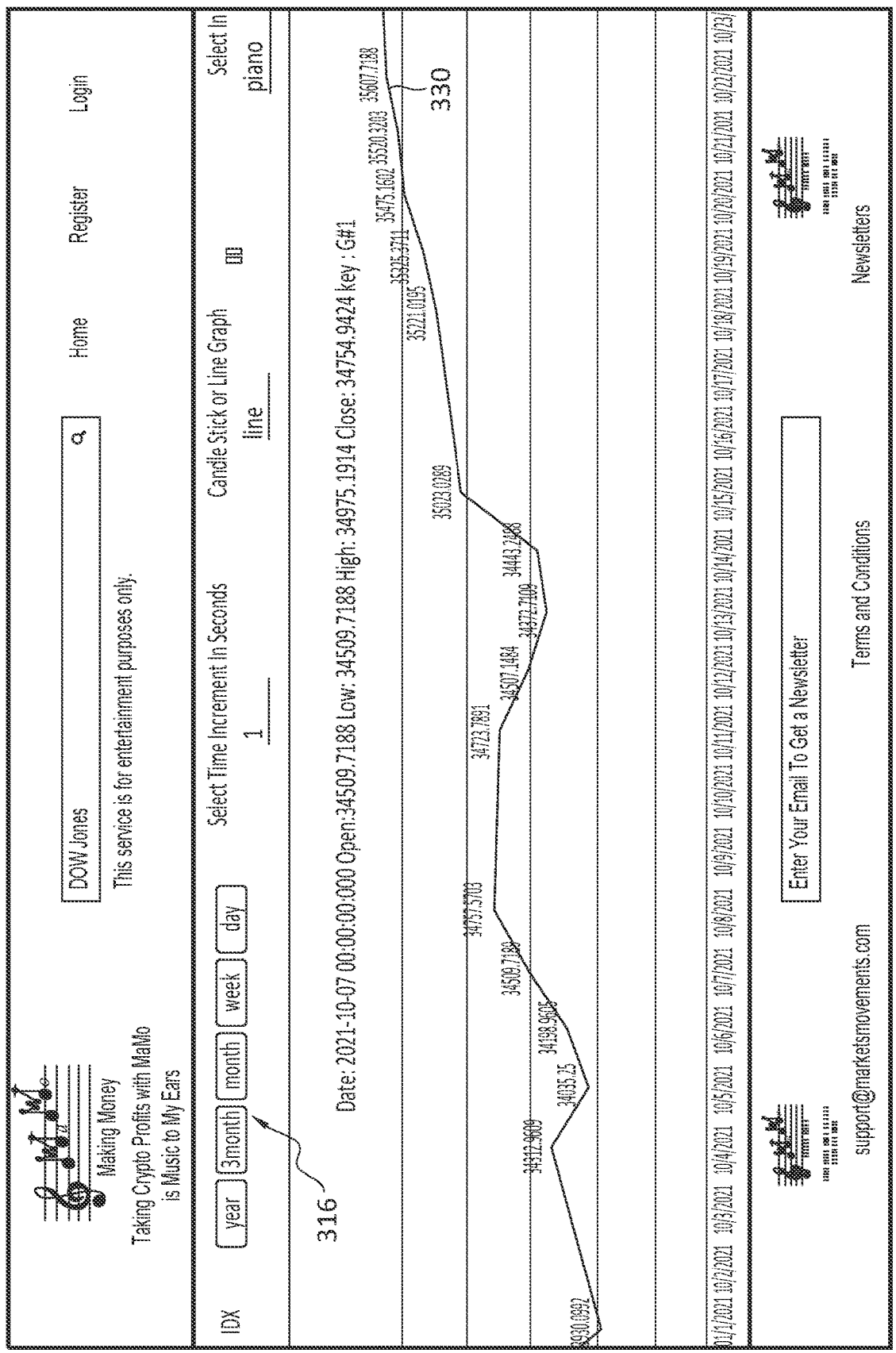
FIG. 3H is a modified version of the graphical user interface of FIG. 3G, with full shading of a visibly displayed historical price chart, thereby visually depicting that the entire price history of the historical price chart over a preselected historical time period has been audibly communicated to the user.

Referring to FIG. 3G, the play button 318 has been depressed by the user, and system 100 has played audible notes corresponding to the price from the beginning 326 of the chart through a middle section 328 thereof. As shown, the portion of linear graphical display 320 between the beginning 326 and middle section 328 thereof has been highlighted or shaded with a different color, visually showing the portion of the chart which has already been audibly communicated. This helps an investor who also wishes to occasionally look at a visual display learn the correspondence between audible changes in pitch and visible changes (up and down) of the linear graphical display on-screen. In FIG. 3G, a note has played every second (in accordance with the selected time increment 312 of one second as shown). Each note played corresponds to a new point or section of the price chart, and as each note plays, the new section of the linear graphical display 320 corresponding to the price (or average price) for which the new note is played is shaded or colored differently compared to the remaining portion of the line graph. Graphical user interface 310 also includes the date, opening price, the low and high of the financial asset during a particular time period outputted, and the closing price during the time period as shown.

In this manner, users who are chart listening in a historical mode of system 100 operation can occasionally view the chart and see the portions of which they have already listened. In certain embodiments, the financial asset "price," which is converted into a musical note, chord, or musical triad may be the spot price of the financial asset. In other embodiments, the financial asset "price" which is converted into an audible note, chord, or musical triad may be a calculation of the average price over a short time interval about the current or historical time corresponding to a particular spot price. In the historical mode of the system 100, once the entire price history of the financial asset over the selected time period 316 has been audibly communicated (FIG. 3H), the linear graphical display 320 for that time period is highlighted or shaded a different color so the user can see this visually if desired.

Figure 3I:
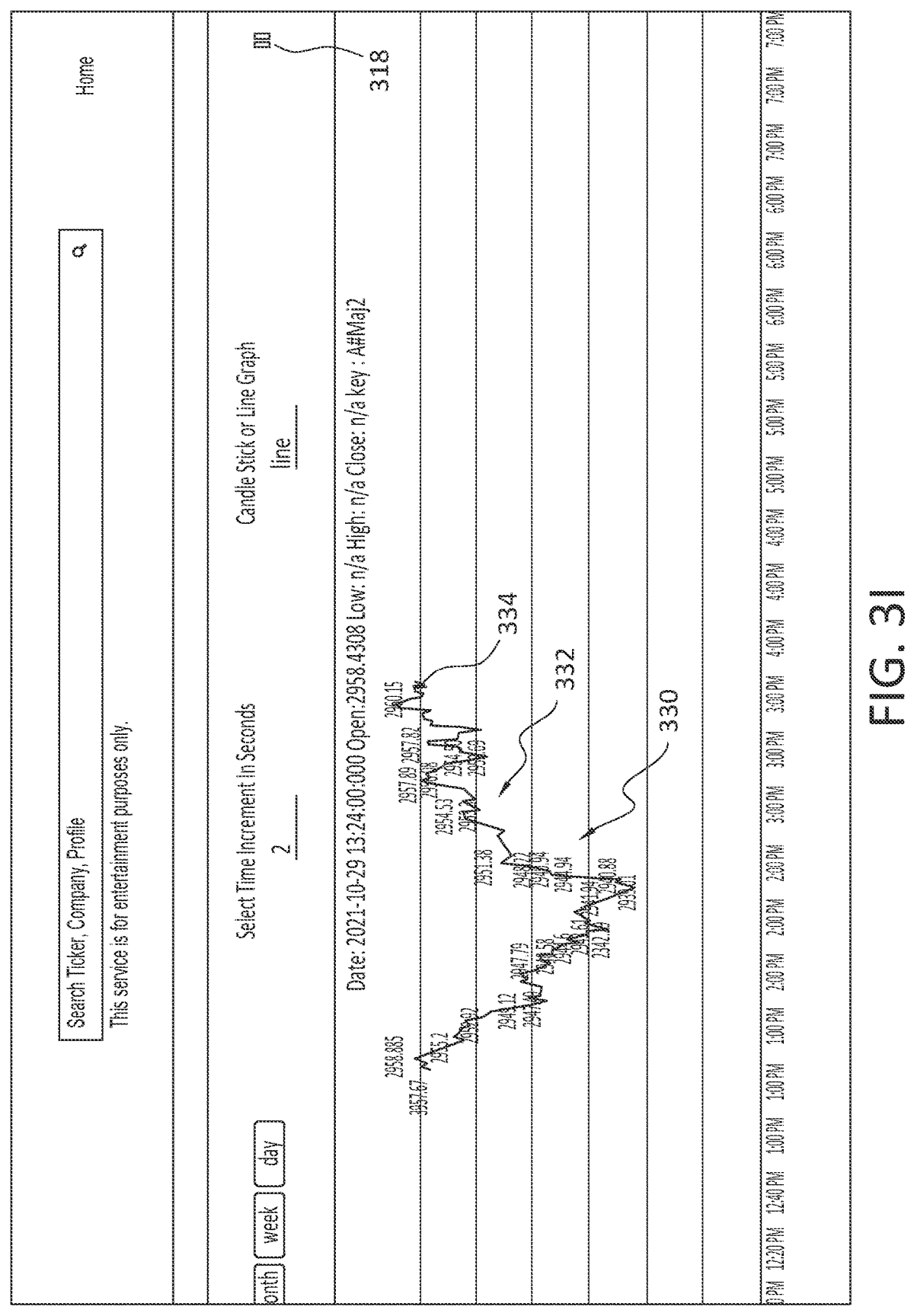

Referring now to FIG. 3I, system 100 is operated in a real-time mode. Ticker symbol GOOG has been selected, and a linear graphical display 330 shows current prices of the stock in real-time, up until the present time 334. "Day" has been selected as the time period, which places system 100 in the real-time mode, and play button 318 has been depressed. System 100 thus outputs audible notes whose pitch correspond to the real-time price of the stock as described above.

As described above, percentage changes in the price of the stock (e.g., +/−0.25%) may correspond to an increase or decrease in the pitch of the note played, and the requisite percentage change may be customizable by the user. In certain embodiments, when the price reaches or approaches a target price preset by the user, system 100 may be configured to issue an alert tone or sequence of tones/notes/chords. In other embodiments, such alerts may be customizable. For example, the user may upload a jingle or song he or she wishes to be played at high volume when a particular price level is reached.

In certain embodiments of the invention, multiple financial assets may be audibly tracked simultaneously or consecutively while operating system 100 in the real-time mode. For example, in such embodiments, system 100 is configured to input user selections of multiple financial assets to audibly track, prompts a user to select a different instrument 116-122, 324 (FIGS. 1, 3F) corresponding to each inputted financial asset, and to similarly output audio corresponding to the respective prices of these assets as described above.

By way of example, if a user selects three financial assets to track, then system 100 outputs audible notes corresponding to each financial asset, in a different instrument, and at a particular pitch or volume corresponding to that financial asset's price. Since in such embodiments different instruments are utilized for each financial asset audibly tracked, the user is able to audibly track multiple financial assets simultaneously. By listening to multiple financial assets at the same time, the user may notice that some of his or her financial assets are changing more rapidly than others, and possibly even notice correlations. By contrast, if several selected assets in a particular sector of a financial market (e.g., technology stocks) are all moving up rapidly (indicated by a rise in pitch of each instrument), then it may be an indication that this sector of the market, or even the NASDAQ as a whole, may be surging.

In other embodiments, system 100 is configured to concurrently play multiple audibly tracked assets. For example, in a real-time mode of operation, system 100 may be configured to play a first financial asset for thirty seconds, then a second financial asset for thirty seconds, then a third financial asset for thirty seconds, and then return to the first financial asset. Prior to playing each financial asset, system 100 may be configured to announce which asset is about to be played (e.g., the name of the company, stock ticker, etc). It will be appreciated, however, that simultaneous play rather than concurrent play will give investors more continuous live coverage of particular financial assets. In certain embodiments, system 100 allows users to set up musical parameters for a plurality of financial assets, and allows a user to select one or more of such assets for simultaneous or concurrent play. System 100 may also utilize one or more displays, such as on a smartphone or smartwatch, to simultaneously display the prices corresponding to each financial asset being tracked and outputted audibly as described above. In yet other embodiments, system 100, during concurrent play of financial assets, may play transition music, a jingle, notes, or an announcement before playing audible intervals of each tracked financial asset.

As noted above, system 100 can also be configured to create musical compositions which correspond to known visual patterns of stock movements. System 100 may be configured to allow a user to convert a particular musical playback (e.g., the notes played during a particular real-time or historical mode of operation) as an audio file that the user can use as, for example, his or her personal identifier, tone, ring-tone, or non-visual avatar (e.g., a unique audible identifier which a visually impaired investor can use to announce himself or herself in other applications, or as a form of authentication or personal security key if kept private). System 100 may be configured to allow a user to access the history of a trade they have made money on (e.g., stored in database 156), and use system 100 to create a musical identity by playing the trade and customizing the instruments, time increment, number of instruments, and other musical parameters described herein to create a musical interpretation thereof.

Since the musical inflection of the notes (e.g., the increase and decrease in pitch and the frequency rate thereof) corresponds to the financial asset price's direction and velocity, an investor who is visually impaired may be better able to mentally visualize or follow what is happening based on the audio input he or she receives from system 100 via his or her remote computing device, and/or optional audio notifications stating the actual price. It will be appreciated that system 100 allows for the inclusion of visually impaired individuals with respect to engaging in real-time and historical financial analysis and short term decision making by providing them with tools to do so.

The present disclosure is not intended to be limited to the specific terminology selected, and it will be understood that each specific element referenced includes all technical equivalents which operate in a similar manner. However, techniques, methods, systems, and operating structures in accordance with the invention may be embodied in a wide variety of forms and modes, some of which may be quite different from those in the disclosed embodiments. Consequently, the specific structural, functional and step-by-step details disclosed herein are merely representative. The embodiments herein are described in sufficient detail to enable those skilled in the art to practice the embodiments, and it is to be understood that logical, mechanical, and other changes may be made without departing from the scope of the embodiments. The detailed description disclosed herein is therefore not to be taken in a limiting sense.

It will be understood that the above-described embodiments and arrangements are merely illustrative of the many possible specific embodiments which represent applications of the present invention, and that numerous and varied other arrangements and configurations can be readily devised without departing from the spirit and scope of the invention and equivalents thereof.

While various embodiments of the invention herein are described with respect to financial asset price, it will be appreciated that the systems and methods disclosed could be used to track and audibly communicate other forms of financial asset information, such as, for example, volume, stochastics, moving averages, and the like, which may be mapped to tones in the same way that price changes are mapped to tones. Such information may be imported from other third party APIs. While certain embodiments of the invention are described herein for tracking and audibly communicating financial information, it will be appreciated the invention can be used for tracking and audibly communicating any type of information that changes over time. Such examples may be in the context of election results, temperature and pressure monitoring, various patient vitals in a hospital setting, a runner's pulse during a race or marathon, traffic patterns and density, air traffic controllers viewing the locations, altitudes, and rates of descent of aircraft, etc. It will be appreciated that the present invention may be helpful in virtually any context in which constant visual monitoring of variable data would otherwise be needed. The systems and methods of the present invention may also be applied, for example, to fictional data feeds for classroom use, education, and training.

While specific systems are disclosed in FIGS. 1 and 1A, it will be appreciated that system 100 may be realized by one of remote computing devices 102-108 running app 105 which communicates directly with third party APIs 110A, 110B, 110C. In this manner, a processor on one of remote computing devices 102-108 communicates directly with third party APIs 110A, 110B, 110C without server 150, and simply runs the software which enables the various functionalities described herein.

What is claimed is:

1. A computer-implemented system for audibly conveying financial information, the system comprising:
at least one processor operatively coupled, via a network, to a data source, wherein the at least one processor executes computer instructions that cause the system to:
receive, from the data source, financial data associated with a plurality of financial assets, wherein the financial data includes a variable parameter which varies over a time period associated with the financial data for each asset;
receive a plurality of user settings inputted by a user through a computerized graphical user interface, wherein the user settings input comprises:
  (a) assigning a specific and distinct musical instrument to each of the plurality of financial assets;
  (b) determining a percentage change of the variable parameter that triggers a pitch change;
  (c) receiving a starting pitch identifier for a plurality of musical notes generated from the financial data associated with each financial asset;
automatically calculate and determine, for a plurality of values of the variable parameter during the time period, a plurality of musical notes with different pitch based on the plurality of values of the variable parameter and the user setting input;
determine a maximum or minimum pitch value for each assigned distinct musical instrument assigned to the corresponding financial asset;
automatically determine when the generated data for any of the plurality of musical notes extend beyond the maximum or minimum pitch value for the assigned distinct musical instrument;
automatically reassign the generated data and all subsequent musical notes to a lower pitch value for the assigned distinct musical instrument when it is determined that any of the plurality of musical notes exceeds the maximum pitch value; and
automatically reassign the generated data and all subsequent musical notes to a higher pitch value for the assigned distinct musical instrument when it is determined that any of the plurality of musical notes extends below the minimum pitch value; and
automatically generate audio data associated with the plurality of musical notes, wherein the generated audio data is processable by a device to audibly produce the plurality of musical notes for each distinct musical instrument assigned to the corresponding financial asset, wherein the musical notes may be played through an audio output of a computerized user device.

2. The computer-implemented system of claim 1, wherein the generated audio data is convertible to sound played by the assigned musical instruments which, when heard by a user of the system, conveys changes and variations in a pricing of the financial assets assigned to the musical instruments by the user.

3. The computer-implemented system of claim 1, wherein the plurality of user settings inputted by a user through a computerized graphical user interface further includes a user-selected and set percentage for a pitch change, and wherein the at least one processor executes computer instructions that cause the system to:
determine an initial note of the plurality of musical notes; and
responsive to a value of the variable parameter changing by at least the user-selected percentage, determine a second note of the plurality of musical notes with a different pitch than the initial note of the plurality of musical notes, automatically calculated based on the set percentage.

4. The computer-implemented system of claim 1, wherein the plurality of user settings inputted by a user through the computerized graphical user interface further includes a user-selected and set percentage for a pitch change, and wherein the at least one processor executes computer instructions that cause the system to:
determine an initial note of the plurality of musical notes; and
responsive to a value of the variable parameter changing by less than a user-selected percentage, determine a second note of the plurality of musical notes with a same pitch as the initial note.

5. The computer-implemented system of claim 1, wherein the at least one user-selected musical parameter includes at least one of a time increment, a musical scale, a number of octaves, or a pitch change amount.

6. The computer-implemented system of claim 1, wherein the variable parameter is a price of a financial asset that varies over a time period, wherein the financial asset is associated with a corresponding musical instrument.

7. The computer-implemented system of claim 1, wherein determining the plurality of musical notes during the time period includes determining a first pitch of a first note, a second pitch of a second note, and whether or not the second pitch is equal to, higher, or lower than the first pitch based on a direction of the change in a value of the variable parameter and the determined percentage change of the variable parameter that triggers a pitch change during a portion of the time period.

8. The computer-implemented system of claim 1, wherein the automated computer-implemented system is a portable device usable by a user, wherein the portable device includes an audio output interface and a component that audibly produces the plurality of musical notes from said generated audio data for a plurality of musical instruments.

9. The computer-implemented system of claim 1, wherein the at least one processor is on a server operatively coupled to a portable device usable by a user, and the portable device includes an audio output interface and a component that audibly produces the plurality of musical notes from said generated audio data for a plurality of musical instruments.

10. The computer-implemented system of claim 1, wherein the processor is further configured to operate both in a real-time mode and a historical mode, wherein:
in the real-time mode, the financial data received includes real-time prices or changes in pricing of a financial asset, and
in the historical mode, the financial data received includes past prices or changes in pricing of the financial asset.

11. The computer-implemented system of claim 1, wherein the generated audio data includes notes for each different musical instrument for each associated financial asset, wherein the notes for different musical instruments are concurrently audibly played through the audio output of the computerized user device.

12. The computer-implemented system of claim 11, further comprising:
audibly producing, by the device, the notes for different musical instruments audibly played through the audio output of the computerized user device.

13. The computer-implemented system of claim 12, wherein the notes for different musical instruments are concurrently audibly played through the audio output of the computerized user device.

14. The computer-implemented system of claim 12, wherein the notes for different musical instruments are simultaneously audibly played as chords through the audio output of the computerized user device.

15. The computer-implemented system of claim 1, wherein one of the plurality of financial assets is a stock and the at least one additional financial asset includes a cryptocurrency.

16. The computer-implemented system of claim 1, wherein the data source includes at least one third party API which provides financial information about at least one of a stock, a cryptocurrency, or a bond.

17. A computer-implemented method for audibly conveying financial information, comprising:
receiving, by the at least one processor, from a data source operatively coupled to the at least one processor via a network, financial data associated with a plurality of financial assets, wherein the financial data includes a variable parameter which varies over a time period associated with the financial data for each asset;
receiving, by the at least one processor, a plurality of user settings inputted by a user through a computerized graphical user interface, wherein the user settings input comprises:
(a) assigning a specific and distinct musical instrument to each of the plurality of financial assets;
(b) determining a percentage change of the variable parameter that triggers a pitch change;
(c) receiving a starting pitch identifier for a plurality of musical notes generated from the financial data associated with each financial asset;
automatically calculating and determining, by the at least one processor, for a plurality of values of the variable parameter during the time period, a plurality of musical notes based on the plurality of values of the variable parameter and the user setting input;
determining a maximum or minimum pitch value for each assigned distinct musical instrument assigned to the corresponding financial asset;
automatically determining when the generated data for any of the plurality of musical notes extend beyond the maximum or minimum pitch value for the assigned distinct musical instrument;
automatically reassigning the generated data and all subsequent musical notes to a lower pitch value for the assigned distinct musical instrument when it is determined that any of the plurality of musical notes exceeds the maximum pitch value;
automatically reassigning the generated data and all subsequent musical notes to a higher pitch value for the assigned distinct musical instrument when it is determined that any of the plurality of musical notes extends below the minimum pitch value; and
automatically generating, by the at least one processor, audio data associated with the plurality of musical notes, for each distinct musical instrument assigned to the corresponding financial asset, wherein the generated audio data is processable by a device to audibly produce the plurality of musical notes corresponding to distinct musical instruments associated with corresponding financial assets.

18. The method of claim 17, further comprising:
converting the generated audio data into audio sound for a plurality of musical instruments associated with corresponding financial assets;
audibly playing through an audio interface and audio output component the generated audio data for the plurality of musical instruments, which, when heard by a user of the system, convey changes and variations in a pricing for the financial assets assigned to the musical instruments by the user.

19. The method of claim 18, wherein the notes for different musical instruments are concurrently audibly played through the audio output of the computerized user device.

20. The method of claim 18, wherein the notes for different musical instruments are simultaneously audibly played as chords through the audio output of the computerized user device.

21. A computer-implemented method for audibly conveying financial information, comprising:
   receiving, by the at least one processor, from a data source operatively coupled to the at least one processor via a network, financial data associated with a plurality of financial assets, wherein the financial data includes a variable parameter which varies over a time period associated with the financial data for each asset;
   receiving, by the at least one processor, a plurality of user settings inputted by a user through a computerized graphical user interface, wherein the user settings input comprises:
   (a) assigning a specific and distinct musical instrument to each of the plurality of financial assets;
   (b) determining a percentage change of the variable parameter that triggers a pitch change;
   (c) receiving a starting pitch identifier for a plurality of musical notes generated from the financial data associated with each financial asset;
   automatically calculating and determining, by the at least one processor, for a plurality of values of the variable parameter during the time period, a plurality of musical notes based on the plurality of values of the variable parameter and the user setting input;
   at least one user-selected musical parameter;
   automatically generating, by the at least one processor, audio data associated with the plurality of musical notes, for each distinct musical instrument assigned to the corresponding financial asset, wherein the generated audio data is processable by a device to audibly produce the plurality of musical notes corresponding to distinct musical instruments associated with corresponding financial assets;
   determining a maximum or minimum pitch value for each assigned distinct musical instrument assigned to the corresponding financial asset;
   automatically determining when the generated data for any of the plurality of musical notes extend beyond the maximum or minimum pitch value for the assigned distinct musical instrument;
   automatically reassigning the generated data and all subsequent musical notes to a lower pitch value for the assigned distinct musical instrument when it is determined that any of the plurality of musical notes exceeds the maximum pitch value; and
   automatically reassigning the generated data and all subsequent musical notes to a higher pitch value for the assigned distinct musical instrument when it is determined that any of the plurality of musical notes extends below the minimum pitch value.

* * * * *